United States Patent [19]
Fabrycy et al.

[11] 3,806,247
[45] Apr. 23, 1974

[54] READING SYSTEM OR STROBOSCOPIC MEASURING INSTRUMENTS

[76] Inventors: Marian Fabrycy, ul. Eblaska 47 m. 84; Stanislaw Michalski, ul. ks. Wojcika 30 m. 1, both of Warszawa, Poland

[22] Filed: June 28, 1973

[21] Appl. No.: 374,655

[30] Foreign Application Priority Data
Aug. 22, 1972 Poland .................. 157397

[52] U.S. Cl. .................. 356/23, 350/112
[51] Int. Cl. .................. G01p 3/40
[58] Field of Search .......... 356/23; 350/110, 112

[56] References Cited
UNITED STATES PATENTS
2,162,120  6/1939  Reed .................. 356/23
2,718,816  9/1955  Loeck .................. 350/112

Primary Examiner—John K. Corbin
Assistant Examiner—S. K. Morrison
Attorney, Agent, or Firm—Eric H. Waters

[57] ABSTRACT

The subject of the present invention is a reading system for stroboscopic measuring instruments, particularly for measuring instruments of a high class of accuracy.

The reading system includes a prism with a basic and vernier scales graduated on its front face facing a spinning disc, this prism being disposed between a pulsating source of light and a spinning disc with a spiral indicator and a radial scale made on its face. The measurement stroke of spiral indicator is equal to the full length of basic scale made on the face of prism, the number of graduations of this basic scale being equal to the number of basic graduations of radial scale made on the face of the spinning disc.

2 Claims, 5 Drawing Figures

READING SYSTEM OR STROBOSCOPIC MEASURING INSTRUMENTS

The subject of the present invention is a reading system for stroboscopic measuring instruments or for measuring instruments with stroboscopic indicators, particularly for measuring instruments of a high accuracy class.

In the known hitherto reading systems of stroboscopic indicators which include a spinning disc with a mark on its face, a light source, a reading system, and a fixed scale enclosing the spinning disc, the measured value is read by visual observation of a fixed image of the mark on the spinning disc and pulse illuninated on the background of fixed scale. The measured value read on such an indicator is suffering from a considerable subjective error of reading, and furthermore graduating of the scale into suitably small units presents difficulties. These imperfections are confining to certain limits the application of stroboscopic indicators, particularly in measuring instruments of high accuracy class.

The objective of the present invention is to eliminate or to limit the above mentioned imperfections by developing a reading system of a high class of accuracy.

This objective has been attained since the reading system for stroboscopic measuring instruments with a spinning disc and a pulsating source of light has been fitted, in our invention, out with a prism having a basic scale and a vernier scale graduated on the face facing the spinning disc, this prism being disposed between the pulsating source of light and the spinning disc with a spiral indicator and a radial scale made on its face. The measurement stroke of the spiral indicator is equal to the full length of basic scale graduated on the face of prism, and the number of graduations of this scale is equal to the number of basic graduations of radial scale graduated on the face of spinning disc.

The embodiment of the invented system is presented in the drawing in which

Figure 2:
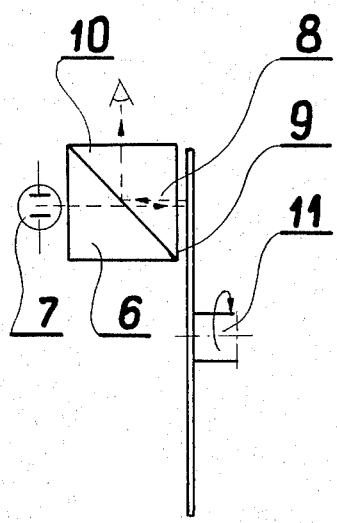
FIG. 2 is a diagrammatic presentation in plan of the system illustrated in FIG. 1.
Figure 1:
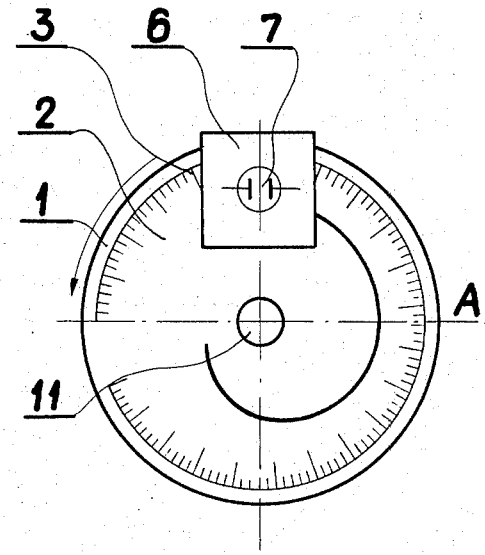
FIG. 1 is a diagrammatic presentation of the system as seen in the direction of the disc face.
Figure 3:
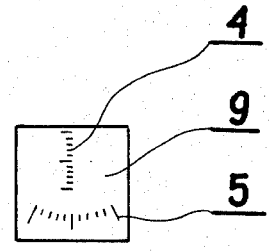
FIG. 3 illustrates the graduated face of the prism.
Figure 4:
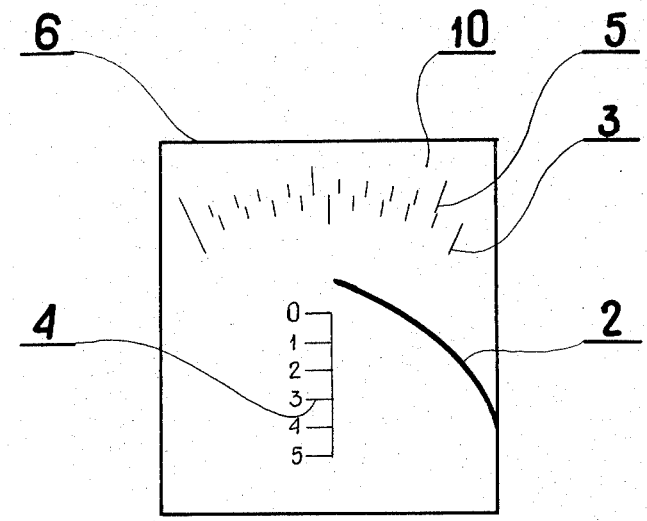
FIG. 4 illustrates zero indication as seen on the second face of the prism.
Figure 5:
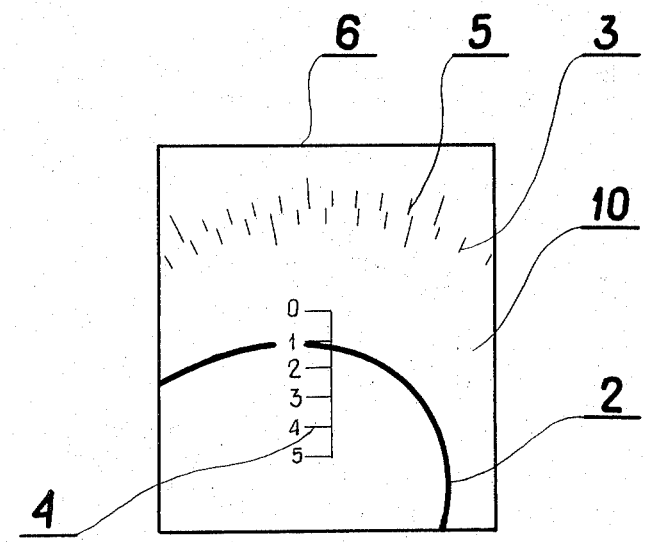
FIG. 5 illustrates indication of a measured value as seen on the second face of the prism.

The invented reading system for stroboscopic measuring instruments includes a disc 1 fixed on a shaft 11 driven either by the machine whose parameters are measured, or by a separate driving source, a pulsating source 7 of light, and two stuck together prisms 6 and 8. A spiral indicator 2 and a radial scale 3 are made on the face of disc 1. A basic scale 4 and a nonius scale 5 are made on face 9 of the prism 8. The stuck together prisms 6 and 8 are disposed between a pulsating light source 7 and the disc 1 in such a manner that front face 9 of prism 8 faces the face of disc 1. Each basic graduation of radial scale 3 of disc 1 is divided into a desired number of minute graduations, for instance 10 graduations, and the vernier scale 5 has the same number of graduations. Radial scale 3 and basic scale 4 are calibrated in units corresponding to the parameter measured. The pulsating source 7 of light illuminates, through prisms 6 and 8, the face to disc 1 thus allowing that spiral indicator 2 can be observed on the background of basic scale 4 of prism 6 on which the hundredths are read, and that the radial scale 3 can be observed on which the tenths are read on the background of vernier scale 5 on which the unit values are read. As an example FIG. 4 illustrates zero indication as seen on face 10 of prism 6, and FIG. 5 illustrates indication of a measured value equal to 117 read in the following manner: 100 read on basic scale 4, 10 read on radial scale 3, and 7 read on vernier scale 5.

The distinctive characteristic of the above described invention is its high accuracy of reading even if the instrument is subjected to vibration during measurement.

What we claim is:

1. A reading system for stroboscopic measuring instruments with spinning disc and pulsating source of light, this system being novel and original because it includes a prism /6/ with a basic scale /4/ and a vernier scale /5/ graduated on face /9/ of the said prism, said face /9/ facing a spinning disc /1/, said prism /6/ being disposed between a pulsating source of light /7/ and the spinning disc /1/, said disc having a spiral indicator /2/ and a radial scale /3/ made on its face.

2. A system as claimed in claim 1, said system being novel and original because the measurement stroke of spiral indicator /2/ is equal to the full length of basic scale /4/ made on the face of prism /6/, the number of graduations of this scale being equal to the number of basic graduations of radial scale /3/ made on the face of spinning disc /1/.

* * * * *